US012424231B2

(12) United States Patent
Sen et al.

(10) Patent No.: US 12,424,231 B2
(45) Date of Patent: Sep. 23, 2025

(54) HIERARCHICAL SPATIAL RESOLUTION CODEC

(71) Applicant: Apple Inc., Cupertino, CA (US)

(72) Inventors: Dipanjan Sen, Dublin, CA (US); Moo Young Kim, San Diego, CA (US); Frank Baumgarte, Sunnyvale, CA (US); Sina Zamani, Cupertino, CA (US); Aram Lindahl, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 273 days.

(21) Appl. No.: 18/246,029

(22) PCT Filed: Aug. 31, 2021

(86) PCT No.: PCT/US2021/048354
§ 371 (c)(1),
(2) Date: Mar. 20, 2023

(87) PCT Pub. No.: WO2022/066370
PCT Pub. Date: Mar. 31, 2022

(65) Prior Publication Data

US 2023/0360661 A1 Nov. 9, 2023

Related U.S. Application Data

(60) Provisional application No. 63/083,788, filed on Sep. 25, 2020.

(51) Int. Cl.
*G10L 19/24* (2013.01)
*G10L 19/008* (2013.01)

(52) U.S. Cl.
CPC ............ *G10L 19/24* (2013.01); *G10L 19/008* (2013.01)

(58) Field of Classification Search
CPC .............................. G10L 19/24; G10L 19/008
See application file for complete search history.

(56) References Cited

U.S. PATENT DOCUMENTS 9,967,616 B2 * 5/2018 Garrett ............. H04N 21/42615
2004/0165667 A1 * 8/2004 Lennon ................. G10L 19/173
375/242

(Continued)

FOREIGN PATENT DOCUMENTS

WO WO-2020016484 A1 * 1/2020 ........... G10L 19/008

OTHER PUBLICATIONS

PCT/US2021/048354, "PCT Notification Concerning Transmittal of International Preliminary Report on Patentability (Chapter I of the Patent Cooperation Treaty) and Written Opinion of the International Searching Authority", mailed Apr. 6, 2023, 19 pages.

*Primary Examiner* — Oyesola C Ojo
(74) *Attorney, Agent, or Firm* — Aikin & Gallant, LLP

(57) ABSTRACT

Disclosed is a hierarchical spatial resolution codec that adaptively adjusts the representations of immersive audio content as the target bandwidth for delivering the audio content changes. The audio content may be represented by an adaptive number of content types such as channels/objects, higher-order ambisonics (HOA), and encoded by adaptive spatial coding techniques to support the target bitrate of a transmission channel or user. Adaptive spatial coding techniques may include adaptive channel/object spatial encoding techniques to generate an adaptive number of channels/objects, and adaptive HOA spatial encoding or HOA compression techniques to generate an adaptive order of the HOA. The adaptation may be a function of the target bitrate that is associated with a desired quality, and an analysis that determines the priority of the channels, objects, and HOA. High priority channels/objects may be encoded (Continued)

into a high quality bit-stream while low priority channels/objects may be converted and encoded as HOA.

19 Claims, 5 Drawing Sheets

(56) References Cited

U.S. PATENT DOCUMENTS

| | | | | |
|---|---|---|---|---|
| 2009/0279869 | A1* | 11/2009 | Ogawa | G11B 27/322<br>386/241 |
| 2011/0038423 | A1* | 2/2011 | Lee | G10L 19/008<br>375/240.26 |
| 2012/0029916 | A1* | 2/2012 | Tsujikawa | G10L 21/0272<br>704/200 |
| 2014/0023196 | A1* | 1/2014 | Xiang | G10L 19/008<br>381/17 |
| 2014/0310010 | A1* | 10/2014 | Seo | G10L 19/008<br>704/500 |
| 2015/0356978 | A1* | 12/2015 | Dickins | G10L 19/0208<br>704/226 |
| 2017/0374484 | A1* | 12/2017 | Lando | G10L 19/008 |
| 2018/0338212 | A1* | 11/2018 | Kim | H04S 7/30 |
| 2019/0013028 | A1* | 1/2019 | Atti | G10L 19/167 |
| 2019/0103118 | A1* | 4/2019 | Atti | G10L 19/008 |

* cited by examiner

Bitstream

| | | Packet 1 Highest Bitrate | | | | Packet 2 High-Medium Bitrate | | | | Packet 3 Lowest Bitrate | | | |
|---|---|---|---|---|---|---|---|---|---|---|---|---|---|
| Frame # | | 1 | 2 | 3 | 4 | 5 | 6 | 7 | 8 | 9 | 10 | 11 | 12 |
| Ch/Obj | | 1 | 1 | 1 | 1 | 1 | 1 | 1 | 1 | | | | |
| | | 2 | 2 | 2 | 2 | 2 | 2 | 2 | 2 | | | | |
| | | 3 | 3 | 3 | 3 | • | • | • | • | | | | |
| | | • | • | • | • | • | • | • | • | | | | |
| | | • | • | • | • | • | • | • | • | | | | |
| | | • | • | • | • | • | • | • | • | | | | |
| | | • | • | • | • | L3 | L3 | L3 | L3 | | | | |
| | | • | • | • | • | | | | | | | | |
| | | • | • | • | • | | | | | | | | |
| | | L1 | L1 | L1 | L1 | | | | | | | | |
| HOA | | | | | | 1 | 1 | 1 | 1 | | | | |
| | | | | | | 2 | 2 | 2 | 2 | | | | |
| | | | | | | 3 | 3 | 3 | 3 | | | | |
| | | | | | | • | • | • | • | | | | |
| | | | | | | • | • | • | • | | | | |
| | | | | | | • | • | • | • | | | | |
| | | | | | | • | • | • | • | | | | |
| | | | | | | M1 | M1 | M1 | M1 | | | | |
| STIC | | | | | | | | | | | | | |
| | | | | | | | | | | 1 | 1 | 1 | 1 |
| | | | | | | | | | | 2 | 2 | 2 | 2 |
| Speech | | | | | | | | | | • | • | • | • |
| | | | | | | | | | | | | | |
| Metadata | | • | • | • | • | • | • | • | • | • | • | • | • |

HIERARCHICAL SPATIAL RESOLUTION CODEC

CROSS REFERENCE TO RELATED APPLICATIONS

This application claims the benefit of U.S. Provisional Application No. 63/083,788 filed on Sep. 25, 2020, the disclosure of which is incorporated herein by reference in its entirety.

FIELD

This disclosure relates to the field of audio communication; and more specifically, to digital signal processing methods designed to deliver immersive audio content using adaptive spatial coding techniques. Other aspects are also described.

BACKGROUND

Consumer electronic devices are providing digital audio coding and decoding capability of increasing complexity and performance. Traditionally, audio content is mostly produced, distributed and consumed using a two-channel stereo format that provides a left and a right audio channel. Recent market developments aim to provide a more immersive listener experience using richer audio formats that support multi-channel audio, object-based audio, and/or ambisonics, for example Dolby Atmos or MPEG-H.

Delivery of immersive audio content is associated with a need for larger bandwidth, i.e., increased data rate for streaming and download compared to that for stereo content. If bandwidth is limited, techniques are desired to reduce the audio data size while maintaining the best possible audio quality. A common bandwidth reduction approach in perceptual audio coding takes advantage of the perceptual properties of hearing to maintain the audio quality. For example, spatial encoders corresponding to different content types such as multi-channel audio, audio objects, or higher-order ambisonics (HOA) may enable bitrate-efficient encoding of certain sound features using spatial parameters so that the features can be approximately recreated in the decoder. Spatial encoders representing different points along the trade-off curve of spatial resolution against bandwidth requirement may be selected to suit a target bandwidth. In some techniques, an audio scene may be pre-determined to be represented by higher bandwidth multi-channel audio/audio objects or a lower bandwidth stereo signal. To deliver richer and more immersive audio content using limited bandwidth, other audio coding and decoding (codec) techniques are desired.

SUMMARY

Disclosed are aspects of a hierarchical spatial resolution codec that adaptively adjusts the representations of immersive audio content as the bandwidth of a channel for delivering the immersive audio content changes. Audio scenes of the immersive audio content may be represented by an adaptive number of content types encoded by adaptive spatial coding and baseline coding techniques, and adaptive channel configurations to support the target bitrate of a transmission channel or user. For example, an audio scene may be represented by an adaptive number of channels, an adaptive number of objects, an adaptive order of higher-order ambisonics (HOA), or an adaptive number of other sound field representations. The HOA describes a sound field based on spherical harmonics. The different content types have different bandwidth requirements and correspondingly different audio quality when recreated at the decoder. Adaptive spatial coding techniques may include adaptive channel and object spatial encoding techniques to generate the adaptive number of channels and objects, and adaptive HOA spatial encoding or HOA compression techniques to generate the adaptive order of the HOA. The adaptation may be a function of the target bitrate that is associated with a desired quality, and an analysis that determines the priority of the channels, objects, and HOA. The target bitrate may change dynamically based on the channel condition or the bitrate requirement of one or more users. The priority decisions may be made based on the spatial saliency of the scene elements of the sound field represented by the channels, objects, and HOA.

In one aspect, a channel and object priority decision module operates on the channels of the multi-channel audio and the audio objects to provide priority ranking of the channels and objects to the spatial encoder. Based on the priority ranking and the target bitrate, a channel and object spatial encoder may encode only the high priority channels and objects to generate high quality bit streams of high spatial resolution. The remaining low priority channels and objects may be converted into a lower quality content type such as HOA and spatially encoded by a HOA spatial encoder to generate lower quality bit streams of low spatial resolution that require a lower bandwidth. To adapt to even lower target bitrate, some or all of the low priority channels and objects may be rendered into an even lower quality content type such as a two-channel stereo signal that requires even lower bandwidth. The adaptive encoding capability of the hierarchical spatial resolution codec allows the same audio scene to be represented by different content types according to the target bitrate, for example, by converting some of the objects into HOA and encoding the converted objects in the HOA domain according to the target bitrate.

In one aspect, an HOA priority decision module operates on the HOA content to provide priority ranking of the HOA to the HOA spatial encoder. Based on the priority ranking and the target bitrate, the HOA spatial encoder may encode only the high priority HOA to generate high quality bit streams of high spatial resolution. The remaining low priority HOA may be rendered into a lower quality content type such as a two-channel stereo signal that requires a lower bandwidth. A hierarchy of spatial encoders may thus adaptively generate a mix of bit streams of audio content types of different qualities and different bandwidth requirement as the target bitrate changes.

In one aspect, one or a set of spatial encoders and baseline encoders convert selective scene elements of the channels, objects, HOA, and other sound field representation such as two-channel stereo signals and speech of an audio scene to generate a set of bit streams of varying audio qualities at a set of bitrates. The set of bit streams may be generated in real-time or off-line. Based on the target bitrate of an end user, different scene elements of the channel and object bit streams, HOA bit streams, stereo signal bit streams, and speech bit streams are selected and transmitted to the end user adaptively.

In one aspect, for peer-to-peer audio signal transmission, the hierarchy of spatial encoders may adaptively generate a transport stream with a different mix of channels, objects, HOA, and other scene elements as the target bitrate of the user changes. The mix of the different audio content types may be generated in real-time or off-line.

In one aspect, a method for encoding audio content is disclosed. The method includes receiving audio content. The audio content is represented by a number of content types including first content type and second content type. The first content type may include a number of scene elements. The method also includes determining the priorities of the scene elements of the first content type. Based on the determined priorities of the scene elements and a target bitrate of transmission of the audio content, the method encodes an adaptive number of the scene elements of the first content type into a first content stream. The method further encodes the remaining scene elements of the first content type, which are scene elements that have not been encoded into the first content stream, into a second content stream based on the target bitrate. The second content stream represents spatial encoding of the second content type. The method further generates a transport stream that includes the first content stream and the second content stream for transmission based on the target bitrate.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to “an” or “one” aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Figure 1:
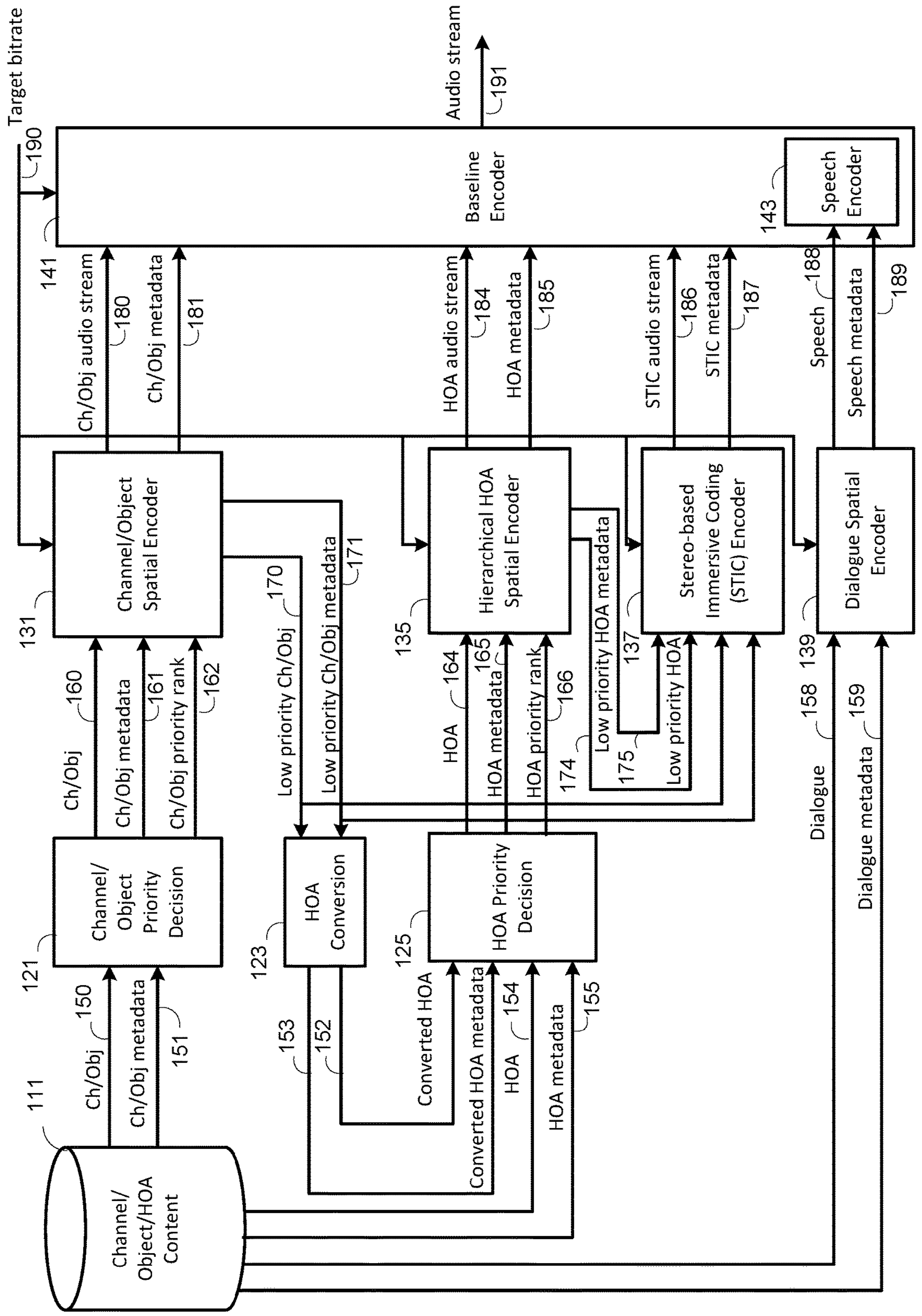
FIG. 1 is a functional block diagram of a hierarchical spatial resolution codec that adaptively adjusts the encoding of immersive audio content as the target bitrate changes according to one aspect of the disclosure.

It is desirable to provide immersive audio content over a transmission channel from an audio source to a playback system while maintaining the best possible audio quality. When the bandwidth of the transmission channel changes due to changing channel conditions or changing target bitrate of the playback system, encoding of the immersive audio content may be adapted to improve the trade-off between audio playback quality and the bandwidth. The immersive audio content may include multi-channel audio, audio objects, or spatial audio reconstructions known as ambisonics, which describe a sound field based on spherical harmonics that may be used to recreate the sound field for playback. Ambisonics may include first order or higher order spherical harmonics, also known as higher-order ambisonics (HOA). The immersive audio content may be adaptively encoded into audio content of different bitrates and spatial resolution as a function of the target bitrate and priority ranking of the channels, objects, and HOA. The adaptively encoded audio content and its metadata may be transmitted over the transmission channel to allow one or more decoders with changing target bitrates to reconstruct the immersive audio experience through spatial decoding and rendering of the adaptively encoded audio content with the aid of the metadata.

Systems and methods are disclosed for an immersive audio coding technique that adaptively adjusts the number of channels, the number of audio objects, the order of HOA, or other sound field representation of audio scenes of immersive audio content to accommodate changing target bitrates of decoders or transmission channel bandwidth. The sound field representation of the audio scenes may be adaptively encoded using a hierarchical spatial resolution codec that adaptively adjusts the spatial coding resolution or compression of the channels, objects, HOA, etc., and quantization of the metadata. The adaptation may be a function of the target bitrate and an analysis that determines the priority of the channels, objects, HOA, etc. The priority decisions may be made based on the spatial saliency of scene elements of the sound field representation so that higher priority scene elements are encoded to maintain a higher quality of the sound field representation while remaining low quality scene elements may be converted and encoded into a lower quality of the sound field representation. Advantageously, the hierarchical spatial resolution coding technique may reduce degradation in the audio quality of transport streams as the target bitrates of decoders fluctuate to maintain the immersive audio experience.

In the following description, numerous specific details are set forth. However, it is understood that aspects of the disclosure here may be practiced without these specific details. In other instances, well-known circuits, structures and techniques have not been shown in detail in order not to obscure the understanding of this description.

The terminology used herein is for the purpose of describing particular aspects only and is not intended to be limiting of the invention. Spatially relative terms, such as “beneath”, “below”, “lower”, “above”, “upper”, and the like may be used herein for ease of description to describe one element’s or feature’s relationship to another element(s) or feature(s) as illustrated in the figures. It will be understood that the spatially relative terms are intended to encompass different orientations of the elements or features in use or operation in addition to the orientation depicted in the figures. For example, if a device containing multiple elements in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and "comprising" specify the presence of stated features, steps, operations, elements, or components, but do not preclude the presence or addition of one or more other features, steps, operations, elements, components, or groups thereof.

The terms "or" and "and/or" as used herein are to be interpreted as inclusive or meaning any one or any combination. Therefore, "A, B or C" or "A, B and/or C" mean any of the following: A; B; C; A and B; A and C; B and C; A, B and C." An exception to this definition will occur only when a combination of elements, functions, steps or acts are in some way inherently mutually exclusive.

FIG. 1 is a functional block diagram of a hierarchical spatial resolution codec that adaptively adjusts the encoding of immersive audio content as the target bitrate changes according to one aspect of the disclosure. The immersive audio content 111 may include various immersive audio input formats, also referred to as sound field representations, such as multi-channel audio, audio objects, HOA, dialogue, and the like. In the case of a multi-channel input, M channels of a known input channel layout may be present, such as a 7.1.4 layout (7 loudspeakers in the median plane, 4 loudspeakers in the upper plane, 1 low-frequency effects (LFE) loudspeaker). It is understood that the HOA may also include first-order ambisonics (FOA). In the following description of the adaptive encoding techniques, audio objects may be treated similarly as channels, and for simplicity channels and objects may be grouped together in the operation of the hierarchical spatial resolution codec.

Audio scenes of the immersive audio content 111 may be represented by a number of channels/objects 150, HOA 154, and dialogue 158, accompanied by channel/object metadata 151, HOA metadata 155, and dialogue metadata 159, respectively. Metadata may be used to describe properties of the associated sound field such as the layout configuration or directional parameters of the associated channels, or locations, sizes, direction, or spatial image parameters of the associated objects or HOA to aid a renderer to achieve the desired source image or to recreate the perceived locations of dominant sounds. To allow the hierarchical spatial resolution codec to improve the trade-off between spatial resolution and the target bitrate, the channels/objects and the HOA may be ranked so that higher ranked channels/objects and HOA are spatially encoded to maintain a higher quality sound field representation while lower ranked channels/objects and HOA may be converted and spatially encoded into a lower quality sound field representation when the target bit-rate decreases.

A channel/object priority decision module 121 may receive the channels/objects 150 and channel/object metadata 151 of the audio scenes to provide priority ranking 162 of the channels/objects 150. In one aspect, the priority ranking 162 may be determined based on the spatial saliency of the channels and objects, such as the position, direction, movement, density, etc., of the channels/objects 150. For example, channels/objects with greater movement near the perceived position of the dominant sound may be more spatially salient and thus may be ranked higher than channels/objects with less movement away from the perceived position of the dominant sound. To reduce the degradation to the overall audio quality of the channels/objects when the target bitrate is reduced, audio quality expressed as the spatial resolution of the higher ranked channels/objects may be maintained while that of the lower ranked channels/objects may be reduced. In one aspect, the channel/object metadata 151 may provide information to guide the channel/object priority decision module 121 in determining the priority ranking 162. For example, the channel/object metadata 151 may contain priority metadata for ranking certain channels/objects 150 as provided through human input. In one aspect, the channels/objects 150 and channel/object metadata 151 may pass through the channel/object priority decision module 121 as channels/objects 160 and channel/object metadata 161, respectively.

A channel/object spatial encoder 131 may spatially encode the channels/objects 160 and the channel/object metadata 161 based on the channel/object priority ranking 162 and the target bitrate 190 to generate the channel/object audio stream 180 and the associated metadata 181. For example, for the highest target bitrate, all of the channels/objects 160 and the metadata 161 may be spatially encoded into the channel/object audio stream 180 and the channel/object metadata 181 to provide the highest audio quality of the resulting transport stream. The target bitrate may be determined by the channel condition of the transmission channel or the target bitrate of the decoding device. In one aspect, the channel/object spatial encoder 131 may transform the channels/objects 160 into the frequency domain to perform the spatial encoding. The number of frequency sub-bands and the quantization of the encoded parameters may be adjusted as a function of the target bitrate 190. In one aspect, the channel/object spatial encoder 131 may cluster channels/objects 160 and the metadata 161 to accommodate reduced target bitrate 190.

In one aspect, when the target bitrate 190 is reduced, the channels/objects 160 and the metadata 161 that have lower priority rank may be converted into another content type and spatially encoded with another encoder to generate a lower quality transport stream. The channel/object spatial encoder 131 may not encode these low ranked channels/objects that are output as low priority channels/objects 170 and associated metadata 171. An HOA conversion module 123 may convert the low priority channels/objects 170 and associated metadata 171 into HOA 152 and associated metadata 153. As the target bitrate 190 is progressively reduced, progressively more of the channels/objects 160 and the metadata 161 starting from the lowest of the priority rank 162 may be output as the low priority channels/object 170 and the associated metadata 171 to be converted into the HOA 152 and the associated metadata 153. The HOA 152 and the associated metadata 153 may be spatially encoded to generate a transport stream of lower quality compared to a transport stream that fully encodes all of the channels/objects 160 but has the advantage of requiring a lower bitrate and a lower transmission bandwidth.

There may be multiple levels of hierarchy for converting and encoding the channels/objects 160 into another content type to accommodate lower target bitrates. In one aspect, some of the low priority channels/objects 170 and associated metadata 171 may be encoded with parametric coding such as a stereo-based immersive coding (STIC) encoder 137. The STIC encoder 137 may render a two-channel stereo audio stream 186 from an immersive audio signal such as by down-mixing channels or rendering objects or HOA to a stereo signal. The STIC encoder 137 may also generate metadata 187 based on a perceptual model that derives parameters describing the perceived direction of dominant sounds. By converting and encoding some of the channels/objects into the stereo audio stream 186 instead of HOA, a further reduction in the bitrate may be accommodated, albeit at a lower quality transport stream. While the STIC encoder 137 is described as rendering channels, objects, or HOA into the two-channel stereo audio stream 186, the STIC encoder 137 is not thus limited and may render the channels, objects, or HOA into an audio stream of more than two channels.

In one aspect, at a medium target bitrate, some of the low priority channels/objects 170 with the lowest priority rank and their associated metadata 171 may be encoded into the stereo audio stream 186 and the associated metadata 187. The remaining low priority channel/object 170 with higher priority rank and their associated metadata may be converted into HOA 152 and associated metadata 153, which may be prioritized with other HOA 154 and associated metadata 155 from the immersive audio content 111 and encoded into an HOA audio stream 184 and the associated metadata 185. The remaining channels/objects 160 with the highest priority rank and their metadata are encoded into the channel/object audio stream 180 and the associated metadata 181. In one aspect, at the lowest target bitrate, all of the channels/objects 160 may be encoded into the stereo audio stream 186 and the associated metadata, leaving no encoded channels, objects, or HOA in the transport stream.

Similar to the channels/objects, the HOA may also be ranked so that higher ranked HOA are spatially encoded to maintain the higher quality sound field representation of the HOA while lower ranked HOA are rendered into a lower quality sound field representation such as a stereo signal. A HOA priority decision module 125 may receive the HOA 154 and the associated metadata 155 of the sound field representation of the audio scenes from the immersive audio content 111, as well as the converted HOA 152 that have been converted from the low priority channels/objects 170 and the associated metadata 153 to provide priority ranking 166 among the HOA. In one aspect, the priority ranking may be determined based on the spatial saliency of the HOA, such as the position, direction, movement, density, etc., of the HOA. To reduce the degradation to the overall audio quality of the HOA when the target bitrate is reduced, audio quality of the higher ranked HOA may be maintained while that of the lower ranked HOA may be reduced. In one aspect, the HOA metadata 155 may provide information to guide the HOA priority decision module 125 in determining the HOA priority ranking 166. The HOA priority decision module 125 may combine the HOA 154 from the immersive audio content 111 and the converted HOA 152 that have been converted from the low priority channels/objects 170 to generate the HOA 164, as well as combining the associated metadata of the combined HOA to generate the HOA metadata 165.

A hierarchical HOA spatial encoder 135 may spatially encode the HOA 164 and the HOA metadata 165 based on the HOA priority ranking 166 and the target bitrate 190 to generate the HOA audio stream 184 and the associated metadata 185. For example, for a high target bitrate, all of the HOA 164 and the HOA metadata 165 may be spatially encoded into the HOA audio stream 184 and the associated metadata 185 to provide a high quality transport stream. In one aspect, the hierarchical HOA spatial encoder 135 may transform the HOA 164 into the frequency domain to perform the spatial encoding. The number of frequency sub-bands and the quantization of the encoded parameters may be adjusted as a function of the target bitrate 190. In one aspect, the hierarchical HOA spatial encoder 135 may cluster HOA 164 and the HOA metadata 165 to accommodate reduced target bitrate 190. In one aspect, the hierarchical HOA spatial encoder 135 may perform compression techniques to generate an adaptive order of the HOA 164.

In one aspect, when the target bitrate 190 is reduced, the HOA 164 and the metadata 165 that have lower priority rank may be encoded as a stereo signal. The hierarchical HOA spatial encoder 135 may not encode these low ranked HOA that are output as low priority HOA 174 and associated metadata 175. As the target bitrate 190 is progressively reduced, progressively more of the HOA 164 and the HOA metadata 165 starting from the lowest of the priority rank 166 may be output as the low priority HOA 174 and the associated metadata 175 to be encoded into the stereo audio stream 186 and the associated metadata 187. The stereo audio stream 186 and the associated metadata 187 requires a lower bitrate and a lower transmission bandwidth compared to a transport stream that fully encodes all of the HOA 164, albeit at a lower audio quality. Thus, as the target bitrate 190 is reduced, a transport stream for an audio scene may have a greater mix of a hierarchy of content types of lower audio quality. In one aspect, the hierarchical mix of the content types may be adaptively changed scene-by-scene, frame-by-frame, or packet-by-packet. Advantageously, the hierarchical spatial resolution codec adaptively adjusts the hierarchical encoding of the immersive audio content to generate a changing mix of channels, objects, HOA, and stereo-signals based on the target bitrate and the priority ranking of scene elements of the sound field representation to improve the trade-off between audio quality and the target bitrate.

In one aspect, audio scenes of the immersive audio content 111 may contain dialogue 158 and associated metadata 159. A dialogue spatial encoder 139 may encode the dialogue 158 and the associated metadata 159 based on the target bitrate 190 to generate a stream of speech 188 and speech metadata 189. In one aspect, the dialogue spatial encoder 139 may encode the dialogue 158 into a speech stream 188 of two channels when the target bitrate 190 is high. When the target bitrate 190 is reduced, the dialogue 158 may be encoded into a speech stream 188 of one channel.

A baseline encoder 141 may encode the channel/object audio stream 180, HOA audio stream 184, and stereo audio stream 186 into an audio stream 191 based on the target bitrate 190. The baseline encoder 141 may use any known coding techniques. In one aspect, the baseline encoder 141 may adapt the rate and the quantization of the encoding to the target bitrate 190. A speech encoder 143 may separately encode the speech stream 188 for the audio stream 191. The channel/metadata 181, associated metadata 185, stereo metadata 187, and the speech metadata 189 may be combined into a single transport channel of the audio stream 191. The audio stream 191 may be transmitted over a transmission channel to allow one or more decoders to reconstruct the immersive audio content 111. The audio stream 191 also be referred to as a transport stream.

Figure 2:
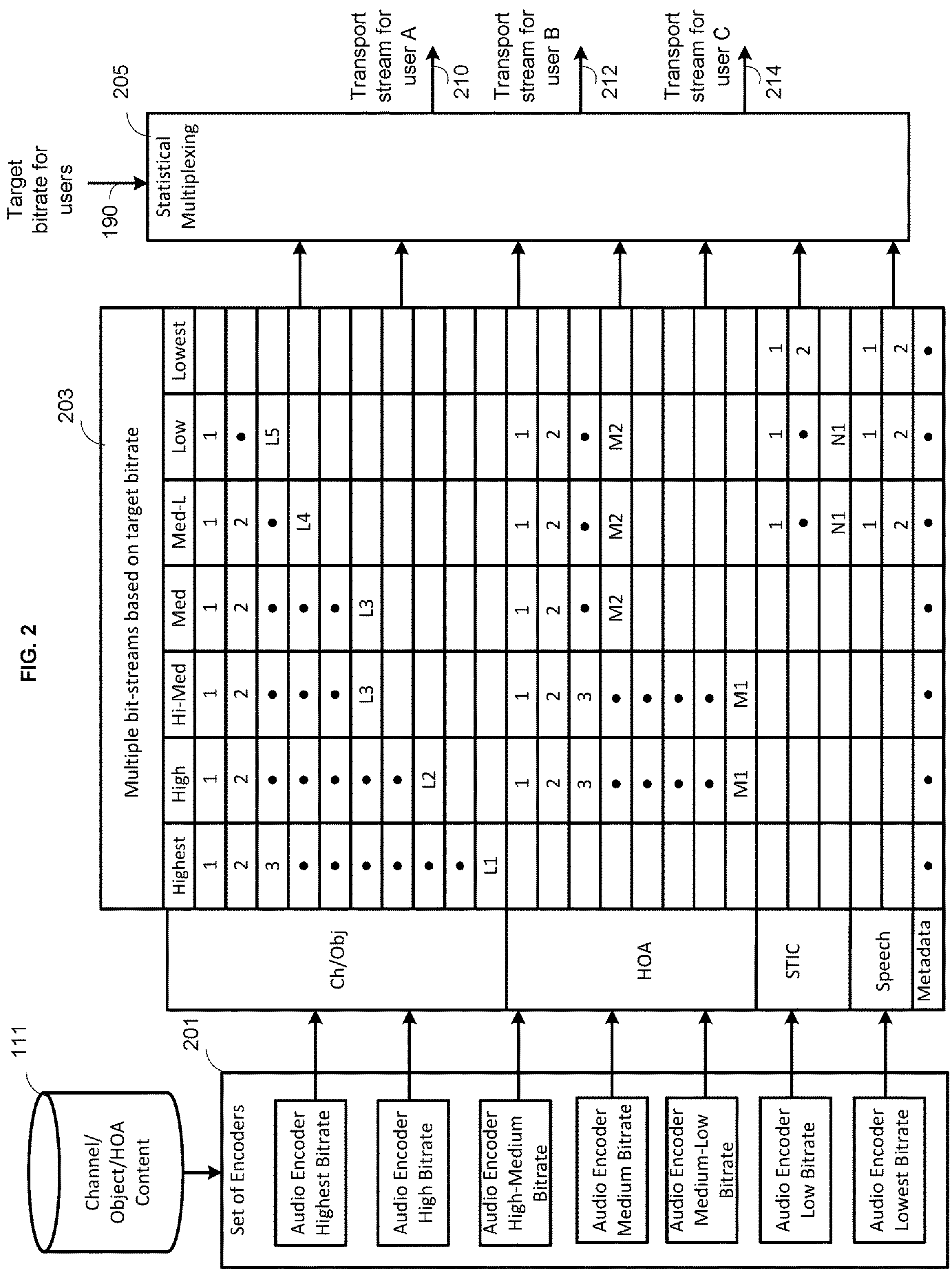
FIG. 2 depicts the hierarchical spatial resolution codec encoding audio scenes in real-time to generate a set of candidate audio bit-streams for a set of bitrates so that the candidate audio bit-streams may be selected to adapt to changing target bitrates of one or more users according to one aspect of the disclosure.

FIG. 2 depicts the hierarchical spatial resolution codec encoding audio scenes in real-time to generate a set of candidate audio bit-streams 203 for a set of target bitrates so that the candidate audio bit-streams 203 may be selected to adapt to changing target bitrates of one or more users according to one aspect of the disclosure. A set of encoders 201 may provide the set of candidate audio bit-streams 203. Each candidate audio bit-stream may include the channel/object audio stream 180, HOA stream 184, stereo audio stream 186, speech stream 188, and metadata as described in FIG. 1 for one possible target bitrate.

The range of possible target bitrates are labeled as highest, high, high-medium, medium, medium-low, low, and lowest in decreasing order. In one aspect, the range of target bitrates may include discrete values of 1 Mbps (mega-bits per second), 768 Kbps (kilo-bits per second), 512 Kbps, 384 Kbps, 256 Kbps, 128 Kbps, and 64 kbps. The set of encoders 201 may include a separate audio encoder, which may include the hierarchical spatial resolution codec of FIG. 1, for each of the possible target bitrates. However, the set of encoders 201 is not thus limited. In one aspect, a single high rate hierarchical spatial resolution codec may be time multiplexed to generate the set of candidate audio bit-streams 203 for all the possible target bitrates.

As shown, for the highest target bitrate, an audio encoder may generate a candidate bit-stream that includes the channel/object audio stream 180 encoding L1 channels/objects of the immersive audio content 111 but no audio streams for HOA, stereo signal, or speech. In another example, the candidate bit-stream for the highest target bitrate may include an HOA audio stream 184 that encodes some order of HOA, a stereo audio stream 186, and/or a speech stream 188. Going down one step in the range of target bitrates to the high target bitrate, some of the L1 channels/objects that have lower priority rank may be converted and encoded into a HOA audio stream 184 of order M1, leaving the channel/object audio stream 180 to encode L2 channels/objects of higher priority rank. Going down one more step to the high-medium target bitrate, the number of channels/objects in the channel/object audio stream 180 are consolidated into L3, where L3 is smaller than L2. Going down another step to the medium target bitrate, the order of HOA in the HOA audio stream 184 are consolidated into M2, where M2 is smaller than M1.

Stepping down further to the medium-low target bitrate, some of the L3 channels/objects that have lower priority rank are converted and encoded into HOA, leaving the channel/object audio stream 180 to encode L4 channels/objects of higher priority rank. The additional converted HOA are prioritized with the existing HOA of order M2, resulting in some of the HOA that have lower priority rank being encoded into the stereo audio stream 186. The HOA audio stream 184 remains at order M2 to encode HOA of higher priority rank. The stereo audio stream 186 is shown with N1 channels to show that it is not limited to two channels. The audio streams for the medium-low target bitrate also includes the speech stream 188.

Stepping further to the low target bitrate, some of the L4 channels/objects that have lower priority rank are converted and encoded into HOA, leaving a channel/object audio stream 180 to encode L5 channels/objects of higher priority rank. The additional converted HOA are prioritized with the existing HOA of order M2 and the order of HOA are consolidated to maintain the HOA audio stream 184 at order M2.

For the lowest target bitrate, all of the channels/objects are converted and encoded into HOA. The additional converted HOA as well as the existing HOA of order M2 are encoded into the stereo audio stream 186 of two channels. There are no channel/object audio stream 180 or HOA stream 184. Note that the candidate bit-streams for all the target bitrates have one metadata transport stream. In one aspect, the set of encoders may further encode the set of candidate audio bit-streams 203 using the baseline encoder 141 based on the range of target bitrates.

A statistical multiplexing module 205 selects one candidate bit-stream that may include the channel/object audio stream 180, HOA stream 184, stereo audio stream 186, speech stream 188, and metadata transport stream based on the target bitrate 190 for each user to adaptively generate the transport stream. The target bitrate 190 for a user may adaptively change scene-by-scene, frame-by-frame, or packet-by-packet. For example, for packet adaptation, when the target bitrate 190 for a user is the highest, the packet of transport stream for the user may include a channel/object audio stream 180 that encodes L1 channels/objects and the metadata transport stream. When the target bitrate for the user changes to medium, the packet of transport stream for the user may change to a channel/object audio stream 180 that encodes L3 channels/objects, an HOA audio stream 184 of order M2, and the metadata transport stream. When the target bitrate for the user changes to low, the packet of transport stream for the user may change to a channel/object audio stream 180 that encodes L5 channels/objects, an HOA audio stream 184 of order M2, a stereo audio stream 186 of N1 channels, a speech stream 188, and the metadata transport stream. The transport streams for multiple users such as the transport stream 210 for user A, transport stream 212 for user B, and the transport stream 214 for user C may be individually tailored to the target bitrate 190 of each user to provide live streaming of the immersive audio content 111.

Figure 3:
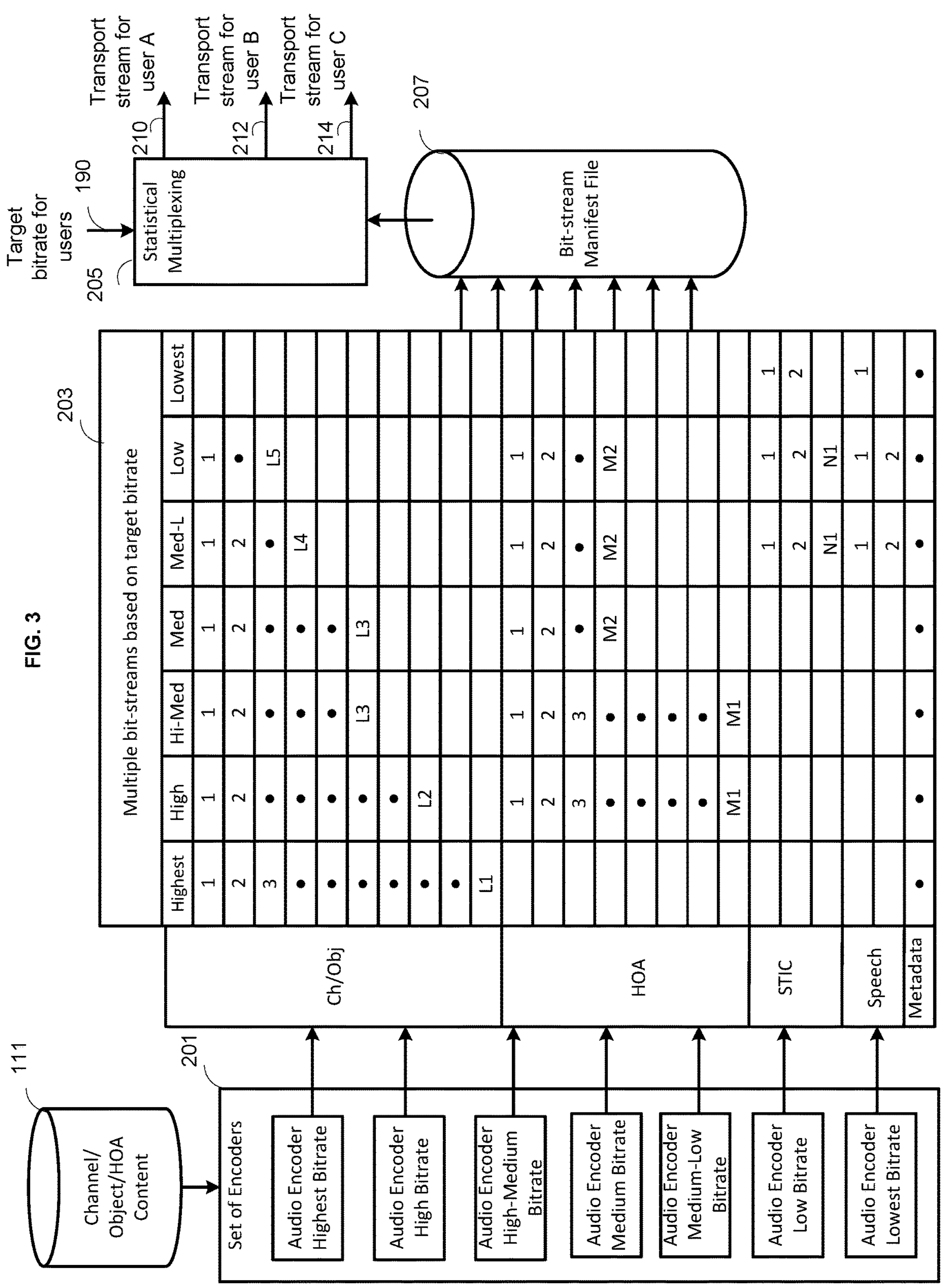
FIG. 3 depicts the hierarchical spatial resolution codec encoding audio scenes off-line to generate a set of candidate audio bit-streams for a set of bitrates to store in a file that may be read to adapt the transport streams to changing target bitrates of one or more users according to one aspect of the disclosure.

FIG. 3 depicts the hierarchical spatial resolution codec encoding audio scenes off-line to generate a set of candidate audio bit-streams 203 for a set of bitrates to store in a file that may be read to adapt the transport streams to changing target bitrates of one or more users according to one aspect of the disclosure. As in FIG. 2, a set of encoders 201 may provide the set of candidate audio bit-streams 203. Each candidate audio bit-stream may include the channel/object audio stream 180, HOA stream 184, stereo audio stream 186, speech stream 188, and metadata encoded from the immersive audio content 111 for one possible target bitrate.

However, instead of live streaming the immersive audio content 111, the set of candidate audio bit-streams 203 may be generated off-line and stored in a bit-stream manifest file 207. When a user is ready to stream the immersive audio content 111, the statistical multiplexing module 205 may read the bit-stream manifest file 207 to select one candidate bit-stream that may include the channel/object audio stream 180, HOA stream 184, stereo audio stream 186, speech stream 188, and metadata transport stream based on the target bitrate 190 for the user to adaptively generate the transport stream. The transport streams for multiple users such as the transport stream 210 for user A, transport stream 212 for user B, and the transport stream 214 for user C may be individually tailored to the target bitrate 190 of each user.

Figure 4:
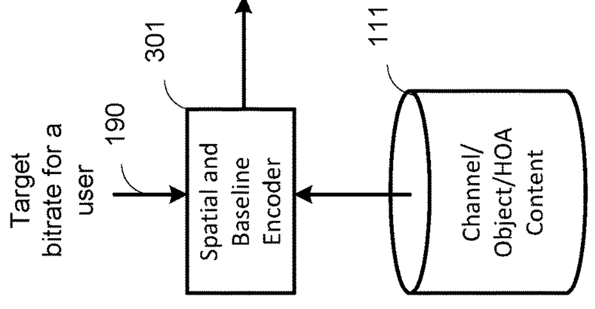
FIG. 4 depicts the hierarchical spatial resolution codec adaptively encoding audio scenes in real-time to generate a transport stream in a peer-to-peer transmission that adapts to changing target bitrates of a user according to one aspect of the disclosure.

FIG. 4 depicts the hierarchical spatial resolution codec adaptively encoding audio scenes in real-time to generate a transport stream in a peer-to-peer transmission that adapts to changing target bitrates of a user according to one aspect of the disclosure. Instead of generating a set of candidate bit-streams for a range of target bitrates as in FIGS. 2 and 3, a spatial and baseline encoder 301, such as the hierarchical spatial resolution codec of FIG. 1, encodes the immersive audio content 111 into a transport stream that may include the channel/object audio stream 180, HOA stream 184, stereo audio stream 186, speech stream 188, and metadata transport stream to adapt to the target bitrate 190 of a user in real-time. In one aspect, the encoded audio streams may be generated off-line, stored in a file, and retrieved at a later time to adapt to the target bitrate of the user.

The spatial and baseline encoder 301 may adapt the encoded audio streams to the target bitrate 190 of the user on the basis of packets, frames, or audio scenes. For example, when each packet includes four frames, at packet 1, when the target bitrate 190 is the highest, the packet of transport stream for the user may include a channel/object audio stream 180 that encodes L1 channels/objects and the metadata transport stream for four frames. At packet 2, when the target bitrate is high-medium, the packet of transport stream for the user may change to a channel/object audio stream 180 that encodes L3 channels/objects, an HOA audio stream 184 of order M1, and the metadata transport stream for four frames. At packet 3, when the target bitrate is the lowest, the packet of transport stream for the user may change to a stereo audio stream 186 of two channels, a speech stream 188 of one channel, and the metadata transport stream for four frames.

Figure 5:
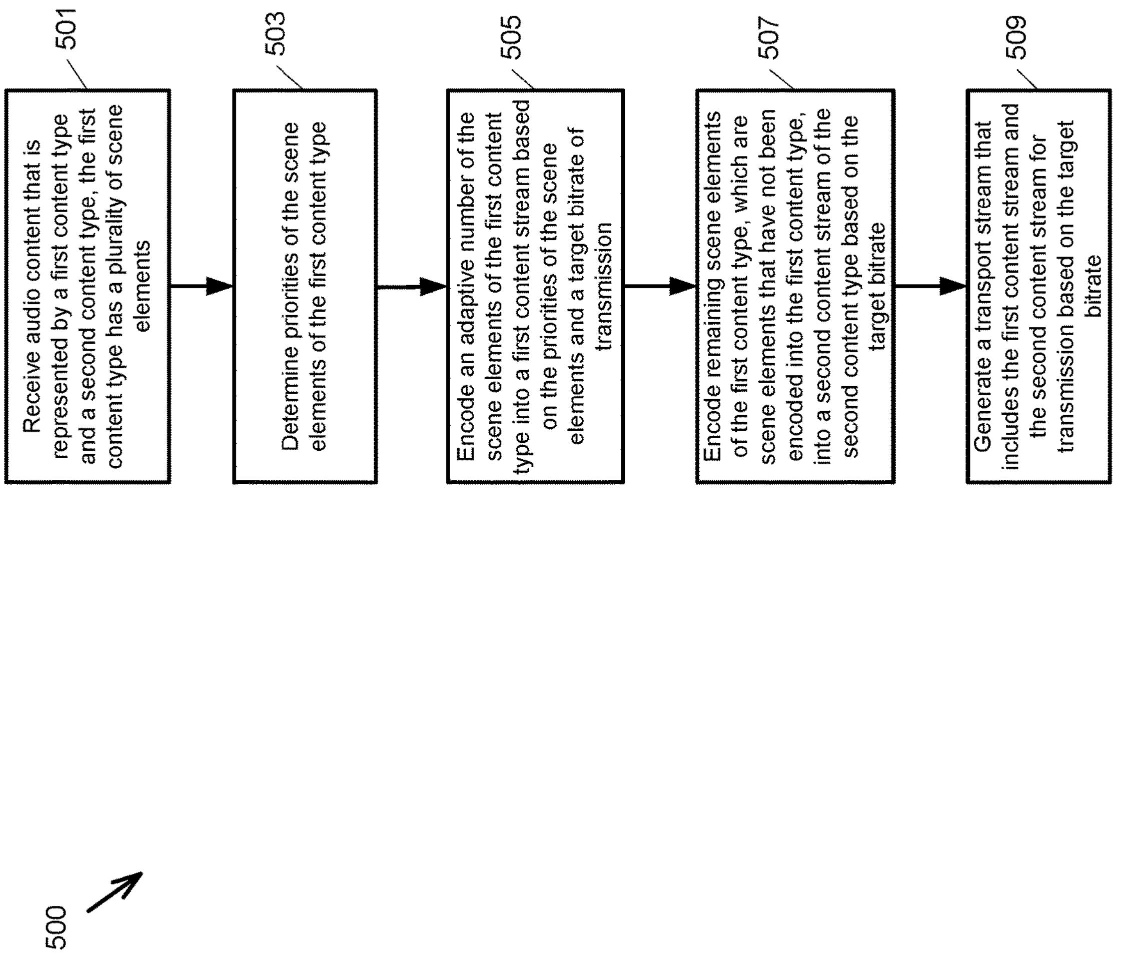
FIG. 5 is a flow diagram of a method of adaptively adjusting the encoding of audio content to generate a hierarchy of content types as the target bitrate changes according to one aspect of the disclosure.

FIG. 5 is a flow diagram of a method 500 of adaptively adjusting the encoding of audio content to generate a hierarchy of content types as the target bitrate changes according to one aspect of the disclosure. Method 500 may be practiced by the hierarchical spatial resolution codec of FIG. 1, 2, 3, or 4.

In operation 501, the method 500 receives audio content. The audio content is represented by a number of content types including first content type and second content type. The first content type may include a number of scene elements. In one aspect, the first content type may include channels/objects and the second content type may include HOA. The number of scene elements may represent the number of channels or objects.

In operation 503, the method 500 determines the priorities of the scene elements of the first content type. In one aspect, the priorities of the scene elements of the first content type may be ranked based on the spatial saliency of the scene elements.

In operation 505, the method 500 encodes an adaptive number of the scene elements of the first content type into a first content stream based on the priorities of the scene elements and a target bitrate of transmission of the audio content. The number of scene elements of the first content type encoded into the first content stream may change as the target bitrate changes.

In operation 507, the method 500 encodes the remaining scene elements of the first content type, which are scene elements that have not been encoded into the first content stream, into a second content stream based on the target bitrate. The second content stream represents spatial encoding of the second content type. The number of scene elements of the second content type encoded into the second content stream may change as the target bitrate changes.

In operation 509, the method 500 generates a transport stream that includes the first content stream and the second content stream for transmission based on the target bitrate.

Embodiments of the hierarchical spatial resolution codec described herein may be implemented in a data processing system, for example, by a network computer, network server, tablet computer, smartphone, laptop computer, desktop computer, other consumer electronic devices or other data processing systems. In particular, the operations described for the hierarchical spatial resolution codec to adaptively encode audio scenes in accordance with changing target bitrates are digital signal processing operations performed by a processor that is executing instructions stored in one or more memories. The processor may read the stored instructions from the memories and execute the instructions to perform the operations described. These memories represent examples of machine readable non-transitory storage media that can store or contain computer program instructions which when executed cause a data processing system to perform the one or more methods described herein. The processor may be a processor in a local device such as a smartphone, a processor in a remote server, or a distributed processing system of multiple processors in the local device and remote server with their respective memories containing various parts of the instructions needed to perform the operations described.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

While certain exemplary instances have been described and shown in the accompanying drawings, it is to be understood that these are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

To aid the Patent Office and any readers of any patent issued on this application in interpreting the claims appended hereto, applicants wish to note that they do not intend any of the appended claims or claim elements to invoke 35 U.S.C. 112(f) unless the words “means for” or “step for” are explicitly used in the particular claim.

What is claimed is:

1. A method of encoding audio content, the method comprising:

receiving, by an encoding device, the audio content, the audio content being represented by one or more content types, a first content type including a plurality of scene elements;

determining priorities of the plurality of scene elements of the first content type;

encoding an adaptive number of the plurality of scene elements of the first content type into a first content stream based on the priorities of the plurality of scene elements and a target bitrate for transmitting the audio content;

encoding into a second content stream remaining scene elements of the first content type not selected for encoding into the first content stream, the second content stream representing encoding of a second content type;

wherein as the target bit rate changes, the adaptive number of scene elements of the first content type is selected based on selecting scene elements having higher priorities than the priorities of the remaining scene elements; and generating a transport stream that includes the first content stream and the second content stream for transmission based on the target bitrate.

2. The method of claim 1, wherein the first content type has a higher quality of sound field representation of the audio content than the second content type.

3. The method of claim 1, wherein a bit-rate for supporting a transmission of the first content type is higher than a bit-rate for supporting a transmission of the second content type.

4. The method of claim 1, wherein determining the priorities of the plurality of scene elements of the first content type comprises:

generating a priority ranking of the plurality of scene elements of the first content type based on a spatial saliency of the plurality of scene elements, wherein a scene element having a higher spatial saliency has a higher quality of sound field representation than another scene element having a lower spatial saliency.

5. The method of claim 1, wherein encoding into the second content stream, based on the target bitrate and priorities of scene elements of the second content type, the remaining scene elements of the first content type not selected for encoding into the first content stream comprises:

converting the remaining scene elements of the first content type into scene elements of the second content type; and encoding the converted scene elements combined with scene elements of the second content type received from the audio content to generate the second content stream based on the target bitrate.

6. The method of claim 5, wherein encoding the converted scene elements combined with scene elements of the second content type received from the audio content comprises:

determining priorities of a plurality of scene elements of the second content type that includes the converted scene elements and the scene elements of the second content type received from the audio content;

encoding an adaptive number of the plurality of scene elements of the second content type into the second content stream based on the priorities of the plurality of scene elements of the second content type and the target bitrate;

encoding into a third content stream based on the target bitrate remaining scene elements of the second content type not selected for encoding into the second content stream, the third content stream representing encoding of a third content type; and generating the transport stream to include the third content stream.

7. The method of claim 6, wherein the first content type has a higher quality of sound field representation of the audio content than the second content type and the second content type has a higher quality of sound field representation of the audio content than the third content type.

8. The method of claim 6, wherein a bit-rate for supporting a transmission of the first content type is higher than a bit-rate for supporting a transmission of the second content type, and the bit-rate for supporting a transmission of the second content type is higher than a bit-rate for supporting a transmission of the third content type.

9. The method of claim 5, wherein determining the priorities of the plurality of scene elements of the second content type comprises:

generating a priority ranking of the plurality of scene elements of the second content type based on a spatial saliency of the plurality of scene elements, wherein a scene element having a higher spatial saliency has a higher quality of sound field representation than another scene element having a lower spatial saliency.

10. The method of claim 5, wherein encoding the adaptive number of the plurality of scene elements of the second content type into the second content stream comprises:

selecting the adaptive number of the scene elements of the second content type based on the selected scene elements having higher priorities than the priorities of the remaining scene elements of the second content type not selected for encoding into the second content stream as the target bitrate changes.

11. The method of claim 1, wherein encoding into the second content stream based on the target bitrate the remaining scene elements of the first content type not selected for encoding into the first content stream comprises:

converting a first subset of the remaining scene elements of the first content type into scene elements of the second content type;

encoding the converted scene elements into the second content stream based on the target bitrate;

encoding into a third content stream, based on the target bitrate, a second subset of the remaining scene elements of the first content type not converted into scene elements of the second type, the third content stream representing encoding of a third content type; and generating the transport stream to include the third content stream.

12. The method of claim 1, wherein generating the transport stream comprises:

performing baseline encoding and spatial encoding of the first content stream and the second content stream based on the target bitrate.

13. The method of claim 1, wherein the audio content comprises voice dialogue as one of the content types, wherein the method further comprises:

encoding the voice dialogue into a speech stream based on the target bitrate; and generating the transport stream to include the speech stream.

14. The method of claim 1, wherein the first content type is associated with metadata that describe properties of the plurality of scene elements of the first content type, wherein encoding the adaptive number of the plurality of scene elements of the first content type into the first content stream comprises:

encoding the metadata associated with the adaptive number of the plurality of scene elements into metadata of the first content stream based on the target bitrate, wherein encoding into the second content stream based on the target bitrate the remaining scene elements of the first content type comprises:

encoding the metadata associated with the remaining scene elements into metadata of the second content stream based on the target bitrate, and wherein generating the transport stream comprises:

combining the metadata of the first content stream and the metadata of the second content stream into one metadata transport stream based on the target bitrate.

15. The method of claim 14, wherein the metadata associated with the first content type comprises metadata to aid the encoding device in determining the priorities of the plurality of scene elements of the first content type and to aid a decoding device in spatial decoding and rendering of the plurality of scene elements of the first content type.

16. The method of claim 1, wherein encoding the adaptive number of the plurality of scene elements of the first content type into the first content stream comprises:

generating a plurality of candidate first content streams based on the priorities of the plurality of the scene elements and a plurality of target bitrates, the plurality of candidate first content streams encoding an adaptive number of the scene elements of the first content type, wherein encoding into the second content stream based on the target bitrate the remaining scene elements of the first content type not selected for encoding into the first content stream comprises:

generating a plurality of candidate second content streams based on the plurality of target bitrates, the plurality of candidate second content streams encoding an adaptive number of scene elements of the second content type that includes the remaining scene elements of the first content type converted into scene elements of the second content type combined with scene elements of the second content type received from the audio content, and wherein generating the transport stream comprises:

selecting one of the plurality of candidate first content streams and one of the plurality of candidate second content streams for the transport stream based on the target bitrate of a user.

17. The method of claim 16, further comprising:

storing in a file the plurality of candidate first content streams and the plurality of candidate second content streams, and wherein generating the transport stream comprises:

selecting from the file one of the plurality of candidate first content streams and one of the plurality of candidate second content streams for the transport stream based on the target bitrate of a user.

18. The method of claim 1, wherein encoding the adaptive number of the plurality of scene elements of the first content type into the first content stream comprises:

generating the first content stream to encode an adaptive number of the scene elements of the first content type based on the priorities of the plurality of the scene elements and as the target bitrate of a user changes;

and wherein encoding into the second content stream based on the target bitrate the remaining scene elements of the first content type not selected for encoding into the first content stream comprises:

generating the second content stream to encode, as the target bitrate of the user changes, an adaptive number of scene elements of the second content type that includes the remaining scene elements of the first content type converted into scene elements of the second content type combined with scene elements of the second content type received from the audio content.

19. The method of claim 1, wherein the first content type comprises audio channels or audio objects, wherein the plurality of scene elements of the first content type comprise a plurality of audio channels or a plurality of audio objects, and wherein the second content type comprises higher-order ambisonics (HOA).

* * * * *